(12) United States Patent
Botelho et al.

(10) Patent No.: US 6,448,567 B1
(45) Date of Patent: Sep. 10, 2002

(54) METHOD AND APPARATUS FOR SHIELDING A VALVE GATE AND OTHER VALVE PARTS

(75) Inventors: James Botelho, Salisbury; Leo V. Klos, Newburyport, both of MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 0 days.

(21) Appl. No.: 09/557,543

(22) Filed: Apr. 25, 2000

(51) Int. Cl.⁷ .................................................. H01J 37/18
(52) U.S. Cl. .............................. 250/492.21; 250/441.11
(58) Field of Search ........................... 250/289, 441.11, 250/430, 435, 438, 496.1, 497.1, 507.1, 515.1, 492.21; 215/329, 326

(56) References Cited

U.S. PATENT DOCUMENTS

| | | | |
|---|---|---|---|
| 2,109,042 A | * 2/1938 | Bennett et al. | 251/167 |
| 3,258,243 A | 6/1966 | Bryant | |
| 4,917,556 A | * 4/1990 | Stark et al. | 414/217 |
| 5,026,995 A | 6/1991 | Hazaki et al. | |
| 5,405,230 A | * 4/1995 | Ono et al. | 414/217 |
| 5,672,882 A | 9/1997 | Day et al. | |
| 5,881,998 A | * 3/1999 | Brenes | 251/335.3 |

FOREIGN PATENT DOCUMENTS

| | | |
|---|---|---|
| DE | 3711293 A1 | 10/1988 |
| JP | 7-42872 | 2/1995 |
| JP | 7-293744 | 11/1995 |
| JP | 8-285133 | 11/1997 |

* cited by examiner

Primary Examiner—John R. Lee
Assistant Examiner—Anthony Quash
(74) Attorney, Agent, or Firm—Wolf, Greenfield & Sacks, P.C.

(57) ABSTRACT

A method and apparatus for shielding a valve gate from potentially harmful environmental conditions. A valve gate can be moved from a closed position, in which the valve gate closes a valve passage and is potentially exposed to harmful environmental conditions, to a retracted position, in which the valve gate is shielded from the harmful environmental conditions. For example, the valve gate can be retracted inside a housing and a door can be closed over an opening in the housing to protect the valve gate. Other portions of the valve, such as a valve seat, can also be protected from harmful conditions, e.g., by closing a valve seat opening to prevent substances or other environmental conditions from leaving the valve passage.

17 Claims, 7 Drawing Sheets

METHOD AND APPARATUS FOR SHIELDING A VALVE GATE AND OTHER VALVE PARTS

FIELD OF THE INVENTION

This invention relates to shielding, or partially shielding, a valve element, such as a valve gate. For example, a valve gate used to close a valve passage and isolate chambers in an ion implantation system may be shielded from ions or other harmful environmental conditions while the valve is open.

BACKGROUND OF THE INVENTION

Valves are used in various applications to isolate two regions from each other and/or control the flow of substances, and in some cases harmful or corrosive substances, from one point to another. In some cases, the substances can cause damage to various valve elements, such as a valve gate or other sealing elements in the valve. For example, some ion implantation systems used to introduce conductivity-altering impurities into semiconductor wafers include a vacuum valve to isolate a source chamber, or a portion of the source chamber, from other parts of the implantation system. This isolation facilitates changing of an ion source, since other portions of the implantation system can be maintained under high vacuum while only a very small portion of the ion source chamber is vented to atmospheric pressure to change the ion source. Once the ion source has been changed, the isolation valve can be reopened to reestablish a high vacuum in the ion source chamber and to allow ions from the source to be transported along the beamline of the implantation system. However, when the valve is open, heat caused by production of the ions and/or ion deposits on the various valve elements, such as the valve gate and/or valve seat, can cause damage to the point that the valve cannot properly seal the ion source chamber from other portions of the implantation system.

SUMMARY OF THE INVENTION

The invention provides a method and apparatus for shielding valve elements from exposure to harmful substances or other environmental conditions while the valve is open. For example, in one aspect of the invention, when a valve gate is retracted from a closed position to a retracted position, a shutter can be closed to shield the valve gate from potentially harmful environmental conditions, such as heat and/or ions. That is, as the valve gate is moved from a closed position to a retracted position, the valve gate moves from within an exposed region that communicates with a valve passage to a shielded region that does not communicate with the valve passage, or has a more limited communication with the valve passage than the exposed region. While in the shielded region, the valve gate is shielded from environmental conditions within the valve passage.

The invention also provides a valve having a valve body and a valve passage formed in the valve body that allows fluid communication between a first side and a second side of the valve body. A valve gate seat is associated with the valve body, so that when a valve gate is moved into a closed position, the valve gate contacts the valve gate seat and prevents fluid communication through the valve passage. The valve gate can be retracted along a travel passage to a retracted position to allow fluid communication through the valve passage. When the valve gate is moved to the retracted position, a shutter may close the gate passage to impede communication between the valve passage and the valve gate through the travel passage. For example, the valve gate may be retracted into a housing and the shutter may close an opening in the housing so that the valve gate is protected from harmful environmental conditions present in the valve passage. The valve gate need not be completely protected from the environmental conditions in the valve passage, but may be partially protected from the environmental conditions.

In one aspect of the invention, the shutter may include a shutter door that is rotatably attached to a housing so that the shutter door may move to open and close an opening in the housing. Thus, when a valve gate is retracted within the housing, the shutter door may rotate to close the opening in the housing. When the valve gate is to be extended out of the housing through the opening, the shutter door may open and allow passage of the valve gate. The shutter may include a spring or other actuator that biases the shutter door toward a closed position. Alternately, the shutter may include an actuator that drives the shutter door to open and close at desired times. The shutter door may also open and/or close in response to the valve gate moving between the retracted position and the closed position.

These and other aspects of the invention will be apparent and/or obvious from the following description.

BRIEF DESCRIPTION OF THE DRAWINGS

The invention is described in connection with the following drawings, in which like numerals reference like elements, and wherein.

DETAILED DESCRIPTION

Figure 1:
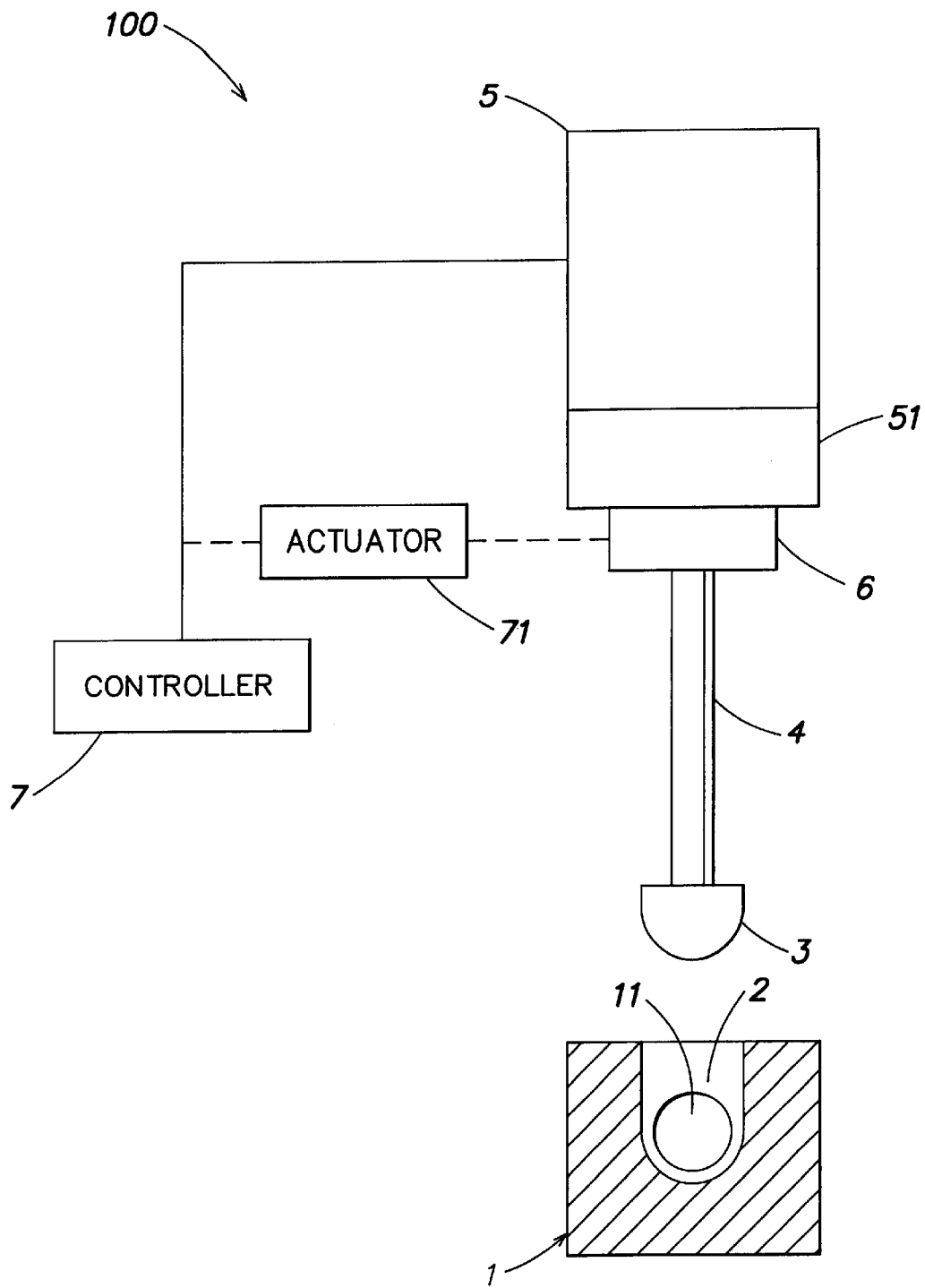
FIG. 1 is a schematic diagram of a valve in accordance with an embodiment of the invention.

FIG. 1 is a schematic block diagram of a valve 100 in accordance with an embodiment of the invention. In this example, the valve 100 includes a valve body 1 and a valve seat 2 associated with the valve body 1. A valve gate 3 is attached to a shaft 4 that can be moved by a valve actuator 5. Thus, the valve actuator 5 can extend the shaft 4 and the gate 3, so that the gate 3 contacts the seat 2 and closes a passage 11 formed in the valve body 1. The gate 3 and the shaft 4 can also be retracted from the closed position to a retracted position within a housing 51. The housing 51 may be a part of the valve actuator 5 housing or be an entirely separate element. Once the gate 3 is in the retracted position inside of the housing 51, a shutter 6 can be closed to shield the gate 3 from harmful environmental conditions, such as heat or corrosive substances, present in the valve passage 11. As shown schematically in FIG. 1, a controller 7 can control the actuator 5, a shutter actuator 71 that actuates the shutter 6, and/or the shutter 6 directly. The shutter 6 can include any one of a number of different types of elements to shield the gate 3 from harmful environmental conditions. For example, the shutter 6 can include a spring-loaded door, a motor or solenoid-actuated door, or any other shielding device. As used herein, the term shutter is intended to refer to any device or structure that tends to shield any valve part, such as the valve gate 3 from harmful environmental conditions, such as heat, corrosive substances, etc. The shutter actuator 71, if present, can include any type of device to actuate the shutter 6, such as mechanical linkages, drive motors, control circuitry, solenoids, shutter 6 position sensors, springs, etc.

The actuator 5 can be or include any type of drive system to move the gate 3 and shaft 4 or perform other functions as desired. For example, the actuator 5 may include a hydraulic or pneumatic actuator that moves the gate 3 and shaft 4 based on fluid movement. Of course, other systems can be used, such as electric motor drive systems, manual drive systems (e.g., as in manual hand wheel operated valves), solenoids, etc. In short, any device can be used for the actuator 5 that results in the desired actuation of the gate 3 to move between the closed position in which the passage 11 in the valve body 1 is closed, and the retracted position in which the passage 11 is at least partially open.

The controller 7 can be or include a general purpose computer or network of general purpose computers that are programmed to perform the desired input/output and other functions. The controller 7 can also include other electronic circuitry or components, such as application specific integrated circuits (e.g., ASICs), other hard-wired or programmable electronic devices, discrete element circuits, FPGAs, etc. The controller 7 can also include other devices, such as user input/output devices (keyboards, touch screens, user pointing devices, displays, printers, etc.), communication devices, data storage devices, mechanical linkages, relays, etc. to perform desired functions.

The valve 100 can be used in various different types of applications to control the flow of substances from one point to another or to isolate, e.g., vacuum isolate, one region from another. In addition, the valve 100 can have various different types of configurations in addition to that shown in FIG. 1. For example, a housing may enclose the entire valve 100. However, the housing is not required and may be eliminated if desired. If the housing is eliminated, the actuator 5, housing 51 and/or the shutter 6 may be mated with the valve body 1 in such a way that when the gate 3 is retracted from the valve seat 2, substances within the passage 11 are prevented from escaping.

Figure 2:
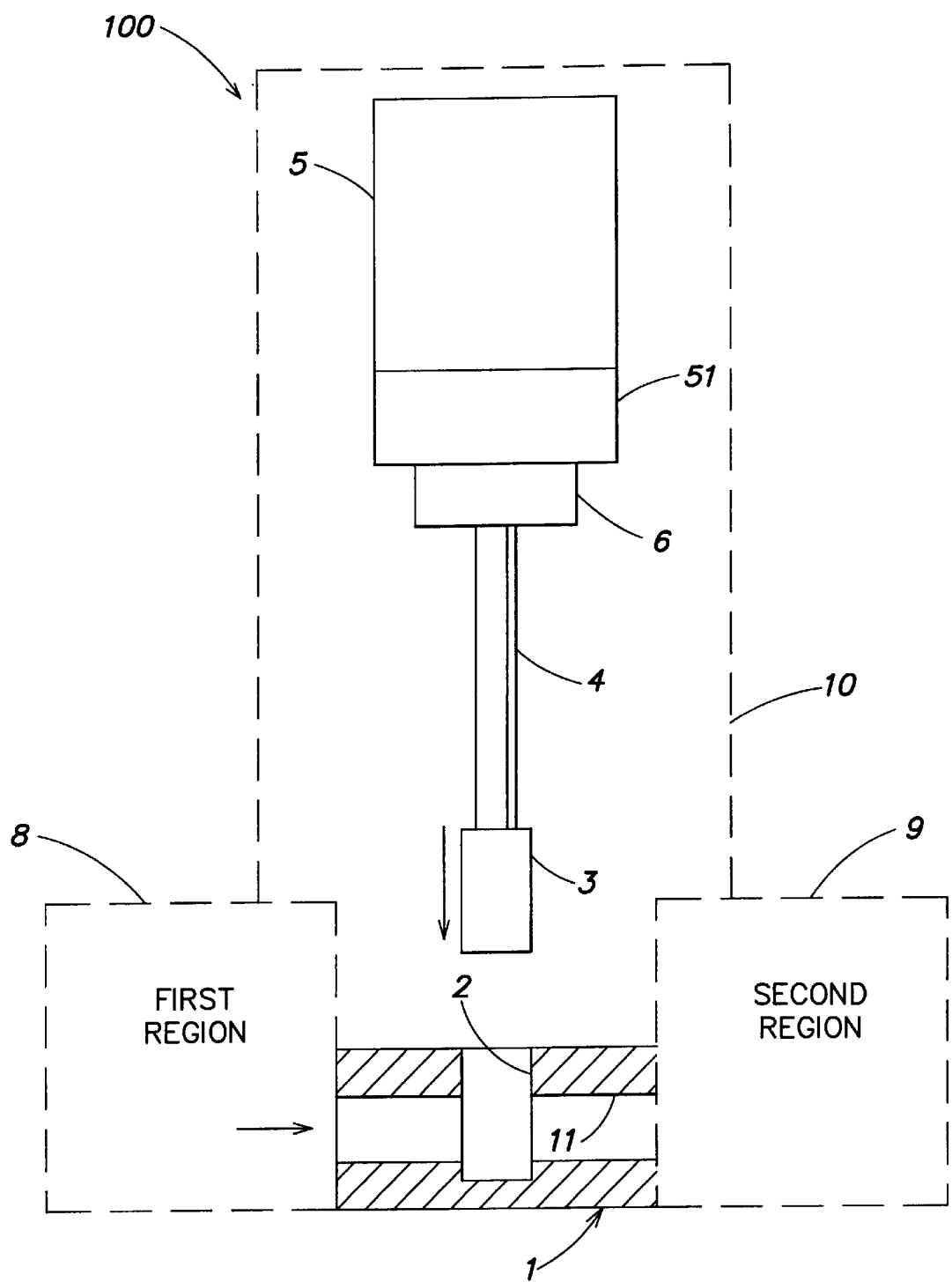
FIG. 2 is a schematic diagram of a side view of the valve shown in FIG. 1.

FIG. 2 shows a side view of the valve 100 in a specific application in which the valve 100 is opened to allow an ion beam to pass from a first region 8 through the valve passage 11 to a second region 9, and is closed to either prevent passage of the ion beam from the first region 8 to the second region 9, or to maintain a high vacuum within the second region 9 and allow the first region 8 to be exposed to atmospheric pressure. The valve 100 in this example is arranged inside of a housing 10 that also encloses the first and second regions 8 and 9. The first region 8 and the second region 9 may be two portions of an ion source chamber in an ion implantation system that are separated by the valve 100. (Although the second region 9 can be part of the ion source chamber, the second region 9 may be any portion of the ion implantation system that is positioned closer to an ion target region, such as a semiconductor wafer region, than the first region 8.). When changing an ion source in the ion source chamber, the first region 8 can be vacuum isolated from the second region 9. That is, the gate 3 and the shaft 4 are fully extended to a closed position, and the gate 3 contacts at least the gate seat 2 to close the passage 11 and prevent communication through the passage 11 from the second region 9 to the first region 8. The first region 8 can then be vented to atmospheric pressure and the ion source changed. After the source is changed or repaired and the first region 8 is evacuated to a relatively high vacuum state, the gate 3 is retracted.

When the actuator 5 retracts the gate 3 from the closed position, the valve passage 11 is opened and the gate 3 subsequently passes through the shutter 6 to a retracted position inside of the housing 51. The shutter 6 then closes to impede communication between the gate 3 and the passage 11. That is, as the gate 3 is retracted, the gate 3 moves from an exposed region having potentially harmful environmental conditions into a shielded region behind the shutter 6. While the gate 3 is in the exposed region, the gate 3 can be subjected to potentially harmful environmental conditions because heat and/or harmful substances within the passage 11 can travel through the valve seat 2 opening to the gate 3. However, once the gate 3 has been retracted into the shielded region, e.g., within the housing 51 and behind the closed shutter 6, the gate 3 is shielded from the potentially harmful conditions.

The shielding provided by the shutter 6 can be a complete shielding of the gate 3 from harmful environmental conditions, such as heat and/or corrosive substances, or the shielding can be partial. For example, the shutter 6 may shield the gate 3 from harmful substances, but not protect the gate 3 from high heat. Similarly, the shutter 6 may provide only partial shielding of the gate 3 from harmful substances. That is, the gate 3 may be exposed to less potentially harmful conditions in the shielded region than in the exposed region. The housing 51 and/or the shutter 6 are preferably designed and constructed to provide shielding from all or a selected group of environmental conditions in the passage 11. For example, if the valve gate 3 is to be protected from heat, the housing 51 and shutter 6 may include thermally insulating material.

Figure 3:
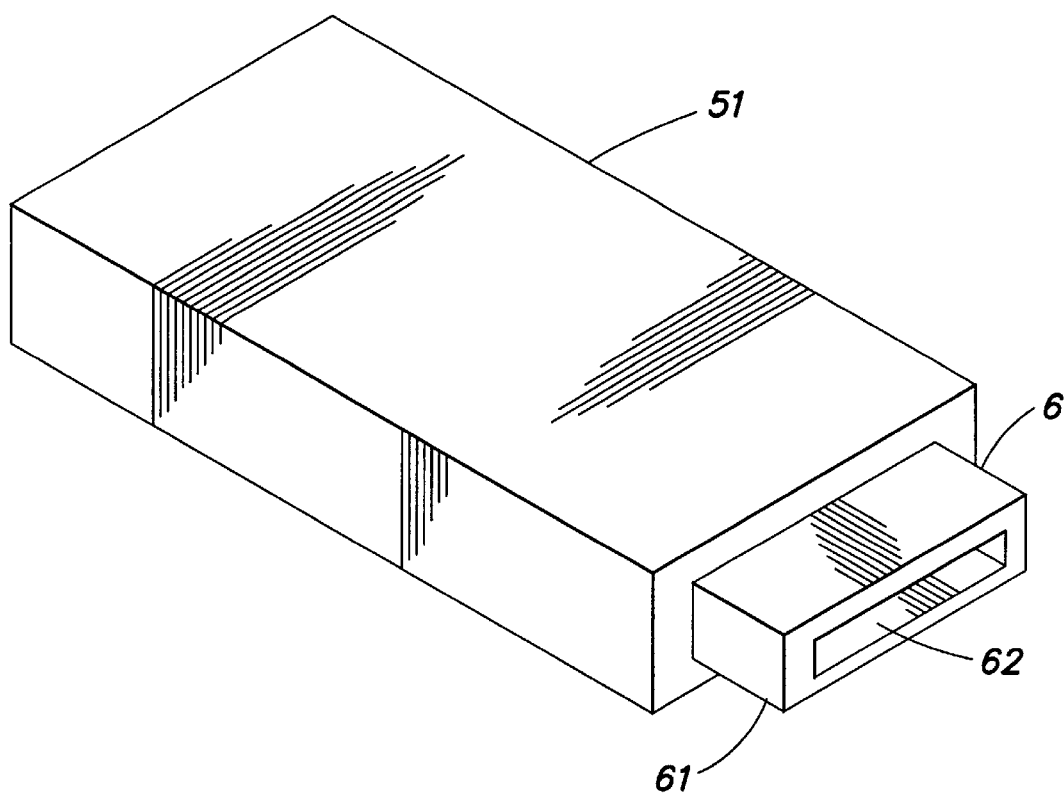
FIG. 3 is a schematic diagram of a valve actuator and a first shutter configuration.

FIG. 3 shows a housing 51 and shutter 6 in a first example of a valve 100 configured in accordance with the invention. In this example, a valve gate 3 (not shown in FIG. 3) has been retracted inside of the housing 51, and the shutter 6 includes an optional cover 61 that has an opening 62. The gate 3 can move through the opening 62 to a closed position in contact with the valve seat 2 of the valve body 1 (see FIGS. 1 and 2). The opening 62 can be sized so that the gate 3 fits closely through the opening 62 and thus minimizes exposure of the gate 3 to potentially harmful environmental conditions when the gate 3 is in the retracted position inside of the housing 51. In this example, the shutter cover 61 provides shielding for the valve gate 3 without the opening 62 being closed when the valve gate 3 is in the retracted position. Alternately, the gate 3 could fit closely within the opening 62 so that when the gate 3 is retracted, a leading surface of the gate 3 blocks the opening 62, thereby shielding the other portions of the gate 3 from harmful conditions. In this example, the leading surface of the gate 3 should be formed so that it provides a shielding function, but does not interfere with the valve operation.

Figure 4:
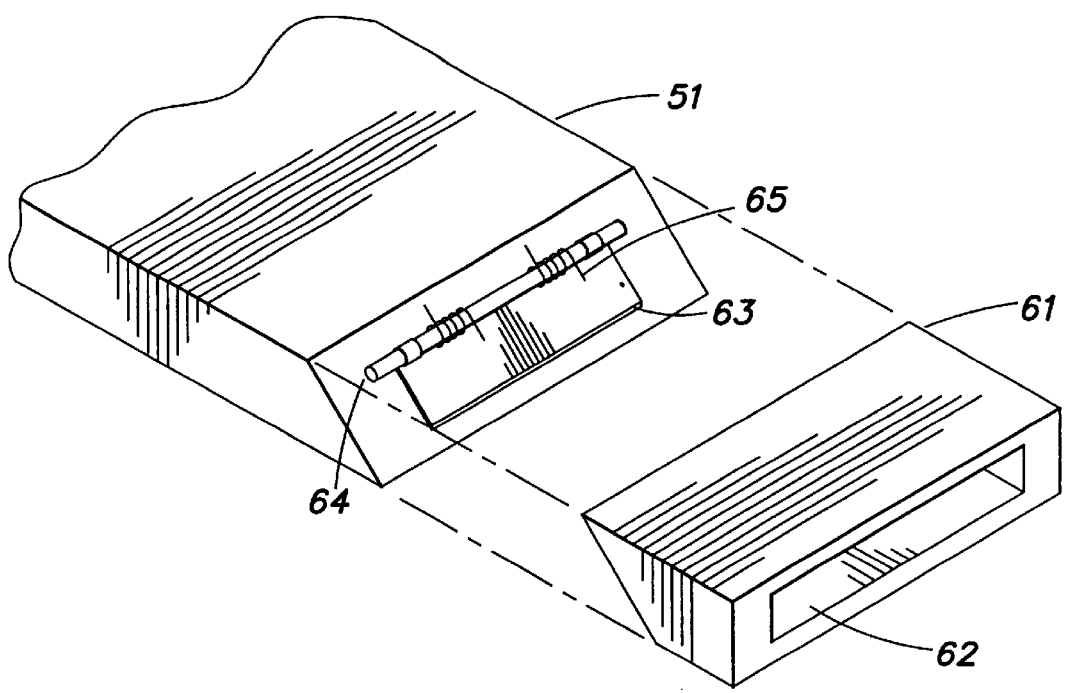
FIG. 4 is a partial exploded view of a second shutter configuration.

FIG. 4 shows an exploded view of an optional configuration of the shutter 6 that is particularly useful in ion implantation system applications. That is, the shutter 6 configuration shown in FIG. 4 can be particularly useful when used in a valve 100 for vacuum isolating a first region 8 from a second region 9 of an ion source chamber. In the example shown in FIG. 4, the shutter cover 61 is attached to the housing 51 and covers a door 63 that is rotatably mounted by a pin 64 to the housing 51. The pin 64 can be fixed to the door 63 or the housing 51, or the pin 64 can be rotatably mounted to either the housing 51 or the door 63. Whatever the specific configuration, the door 63 should be mounted so that it can rotate about the pin 64 relative to the housing 51. A spring 65 in this example is mounted to the pin 64 and is used to bias the door 63 to a closed position against the housing 51. As discussed above, the door 63 can be opened and closed by other mechanisms, such as a mechanical linkage, electric motor, gravity, etc. Alternately, the door 63 need not be biased toward a closed or open position. Instead, the door 63 may engage the gate 3 as the gate 3 is retracted so that the force of the retracting gate 3 closes the door 63. As one example, a hook on the door 63 may engage a corresponding eye on the gate 3 so that as the gate 3 retracts into the housing 51, the eye pulls on the hook so that the door 63 closes. Alternately, the door 63 may be mounted to the leading end of the valve gate 3 so that when the gate 3 is retracted, the door 63 covers an aperture in the housing 51. Other arrangements for opening and/or closing the door 63 or other similar element will be apparent to those skilled in the art.

Figure 5:
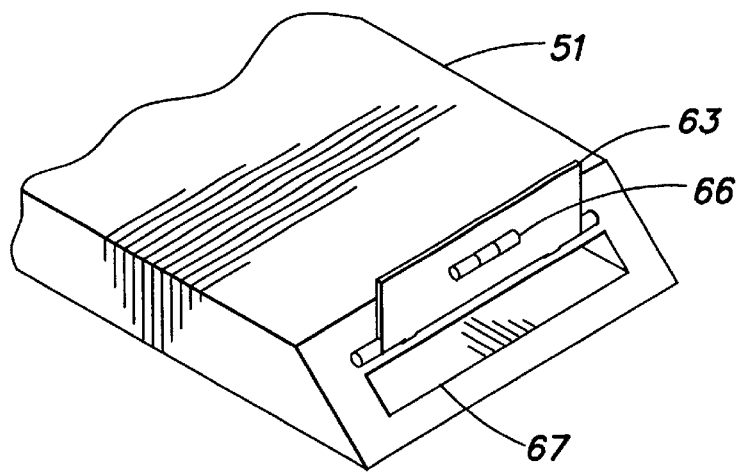
FIG. 5 is a view of the second shutter configuration with a shutter door in an open state.

FIG. 5 shows the door 63 in an open position. In this position, an interior of the housing 51 is open through a shutter aperture 67. The door 63 can be opened by the gate 3 forcing the door 63 open against the force of the spring 65 as the gate 3 moves from the retracted position to the closed position. The gate 63 preferably includes one or more rollers 66 rotatably attached to the door 63 so that the rollers 66 bear on the gate 3 and shaft 4 as the gate 3 is extended toward the closed position. The rollers 66 can prevent damage to the gate 3 and/or door 63 as the gate 3 is extended from the retracted position. The housing 51 and door 63 are preferably made from aluminum, although other materials can be used. The spring 65 can be made from a spring steel or other elastic material. The rollers 66 are preferably made from polypropylene, although other materials can be used. Whatever materials are used to form the various elements of the shutter 6, the specific materials and arrangement of the shutter 6 should be chosen so that possible repeated and prolonged exposure to potentially harmful environmental conditions do not prevent the proper operation of the shutter 6.

The underside of the door 63 and/or the portion of the housing 51 around the shutter aperture 67 can include optional sealing elements, such as a plastic gasket, but such additional sealing elements are not necessary. Suitable shielding properties can be provided by close contact between the door 63 and the housing 51 when the door 63 is closed. In addition, although the door 63 is shown as attached to the housing 51 by the pin 64, the door 63 may be rotatably attached to the cover 61 by the pin 64. In addition, the door 63 may include two or more sub-doors rather than a single door 63 as shown. An additional door may be provided over the opening 62 in the shutter cover 61 to provide additional shielding, or the door 63 may be moved from covering the aperture 67 to covering the opening 62. As discussed above, alternate configurations for a shutter 6 that shields a retracted gate 3 will occur to those skilled in the art.

Figure 9:
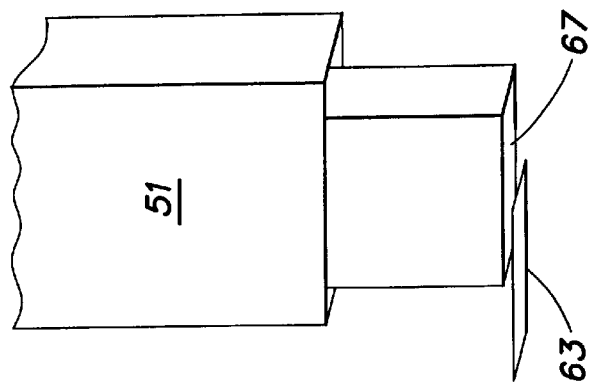
FIG. 9 is a schematic diagram of a sixth shutter configuration.
Figure 8:
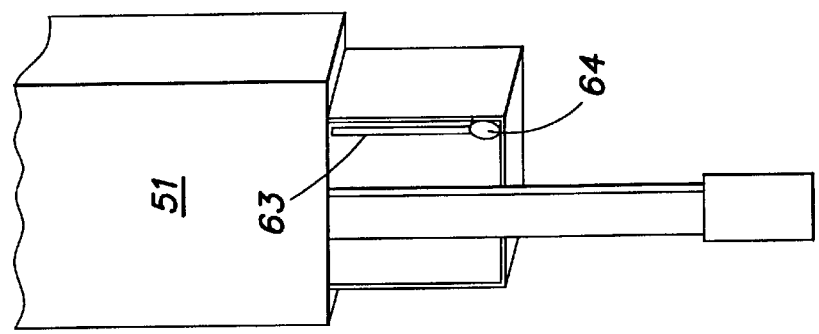
FIG. 8 is a schematic diagram of a fifth shutter configuration.
Figure 7:
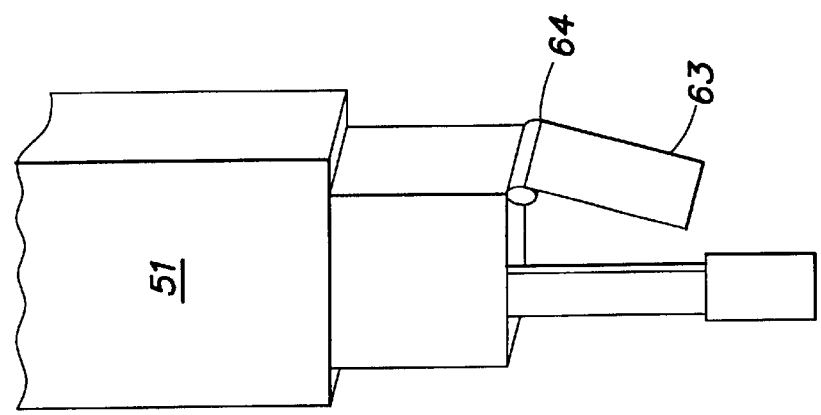
FIG. 7 is a schematic diagram of a fourth shutter configuration.
Figure 6:
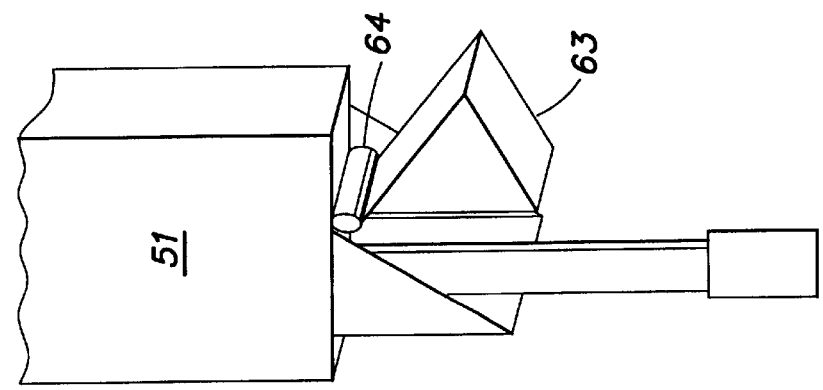
FIG. 6 is a schematic diagram of a third shutter configuration.

FIGS. 6–9 show additional configurations of a shutter door 63. In FIG. 6, a shutter door 63 having a triangular cross section is rotatably mounted to the housing 51 by a pin 64. In this arrangement, the shutter door 63 does not include an opening and is rotatably mounted to the housing 51. FIG. 7 shows an arrangement in which a shutter door 63 opens outwardly away from the housing 51. In the example shown in FIG. 8, a shutter door 63 opens inwardly toward the housing 51. In FIG. 9, a shutter door 63 is opened and closed by sliding the door 63 over the shutter aperture 67. As with the examples described above, the shutter 6 can be activated in various ways, including by spring-loaded mechanisms, motor drive systems, by movement of the gate 3 itself, etc.

Figure 10:
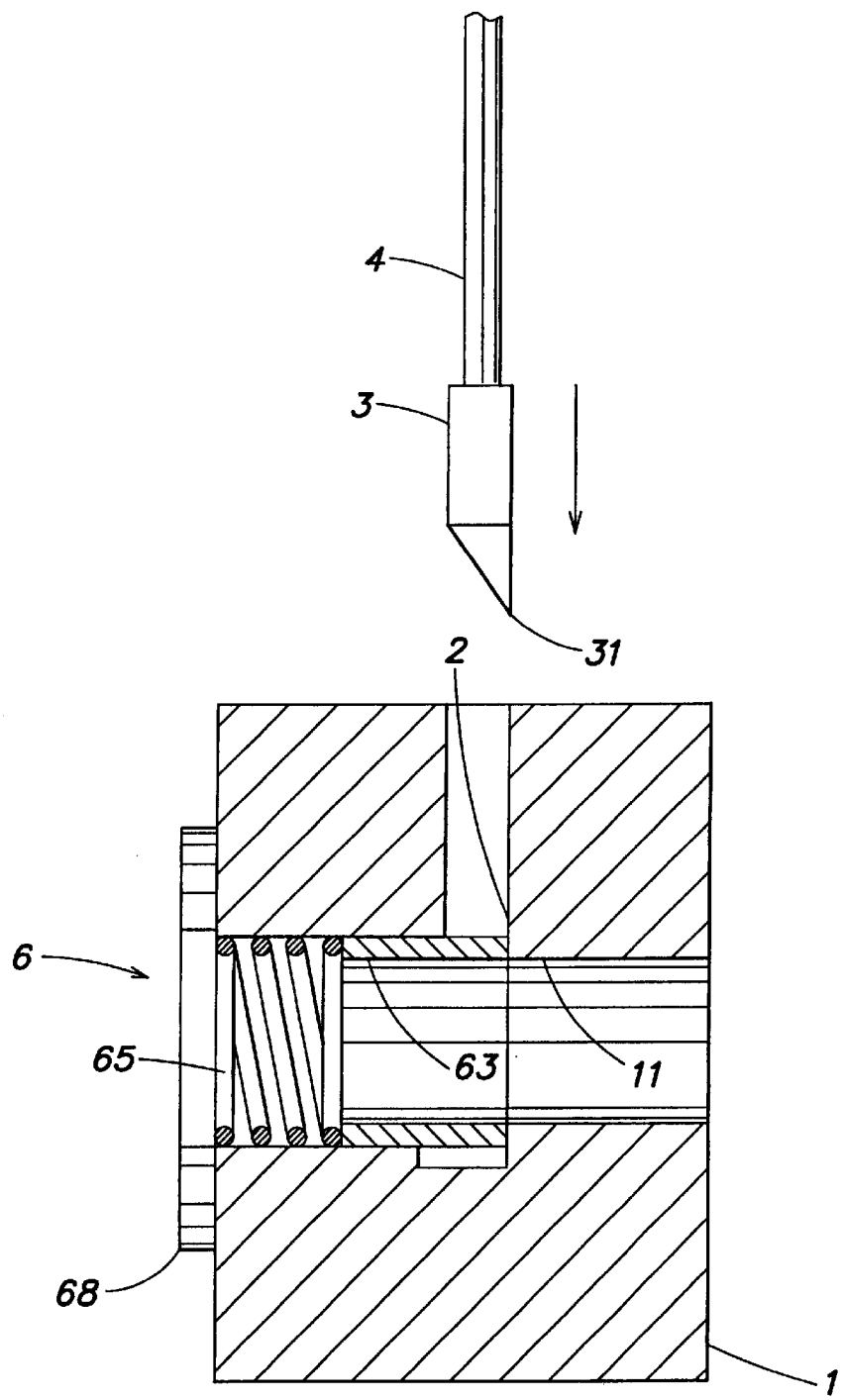
FIG. 10 is a schematic diagram of a seventh shutter configuration.

FIG. 10 shows another arrangement for shielding a gate 3 as well as a valve seat 2. In this example, the shutter 6 includes a shutter door 63 that is mounted within a passage 11 in the valve body 1. The door 63 is biased toward a closed position, shown in FIG. 10, by a spring 65. Both the spring 65 and the door 63 are held within the passage 11 by a retainer 68 that is fixed to the valve body 1. The door 63 in this example is a hollow cylinder, but the door 63 need not have a circular cross section. That is, the door 63 may have a tubular shape with other cross sections, including square, rectangular, etc. Similarly, the spring 65 can be replaced with other elements to actuate the door 63. For example, the spring 65 and retainer 68 may be replaced with a solenoid device that moves the door 63 between closed and open positions.

In this example, the gate 3 includes a tapered section 31 that is inserted between the door 63 and the valve seat 2 as the gate 3 moves toward the closed position. This causes the door 63 to be forced to the left in FIG. 10 against the bias of the spring 65. Thus, the gate 3 can be moved to the fully closed position to prevent fluid communication along the passage 11. When the gate 3 is retracted from the closed position, the door 63 is biased to the right by the spring 65 to the closed position, thus shielding the gate 3 as well as portions of the seat 2 from potentially harmful conditions within the passage 11.

Figure 11:
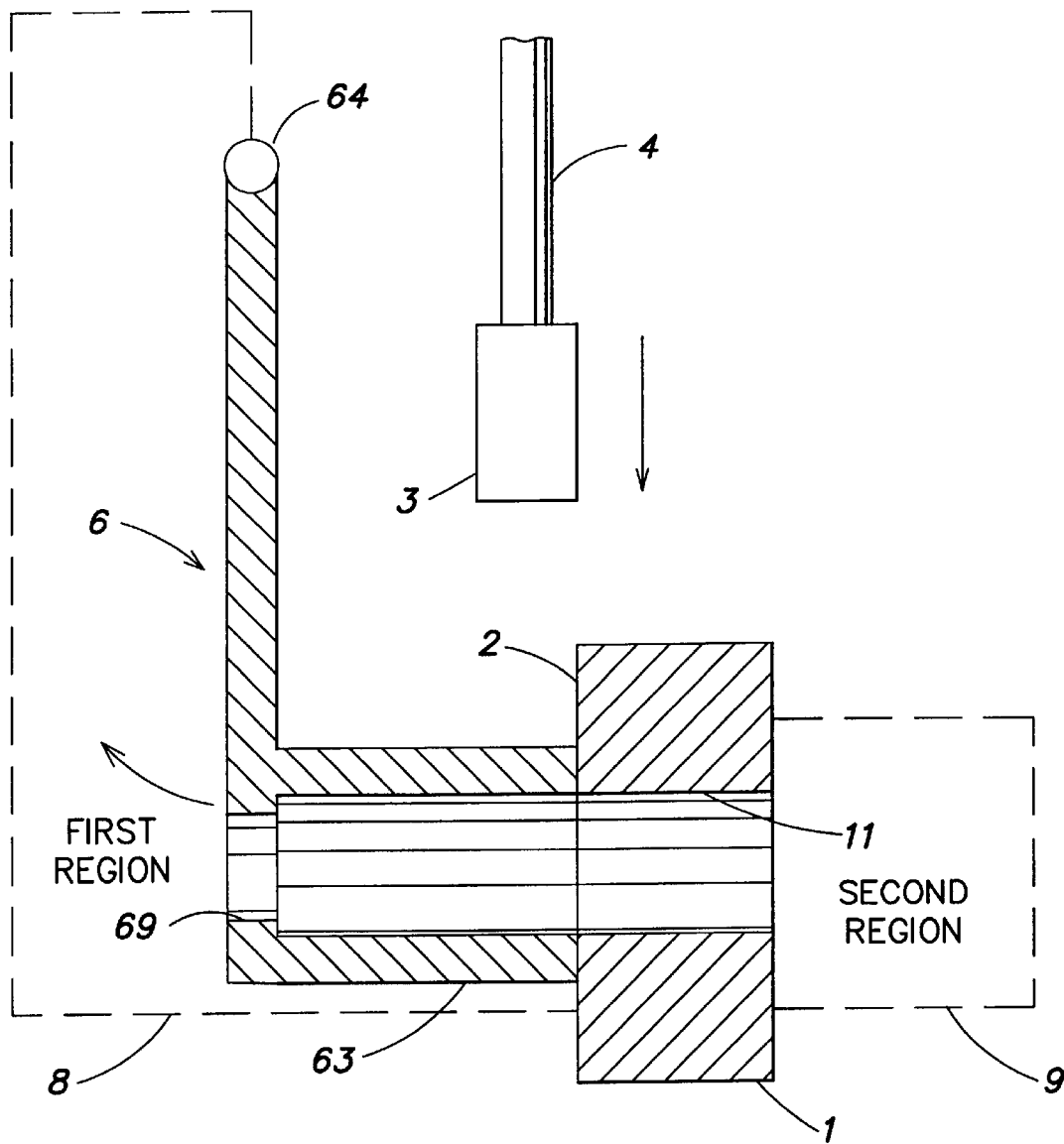
FIG. 11 is a schematic diagram of an eighth shutter configuration.

FIG. 11 shows another optional arrangement for a shutter 6. In this example, the shutter 6 includes a door 63 that rotates about a pin 64. When the door 63 is in the closed position shown in FIG. 11, fluid communication is permitted through the passage 11 in the valve body 1 and an opening 69 in the door 63. Thus, the door 63 shields the gate 3 and the valve seat 2 from potentially harmful conditions within the passage 11 by sealing against the valve seat 2. When the passage 11 is to be closed, the gate 63 is rotated away from the valve body 1 around the pin 64, for example, by actuation of a drive system, and the gate 3 is extended to the closed position, so that the gate 3 contacts the valve seat 2.

While the invention has been described in conjunction with specific embodiments thereof, it is evident that many alternatives, modifications and variations will be apparent to those skilled in the art. For example, in the embodiments shown above, the valve gate 3 is moved along a linear path to open and close a valve. Instead, the valve gate 3 may move in a rotary direction or other directions to open and close a valve. For example, the gate may be rotatably mounted to a valve body so that the gate can open and close the valve. Accordingly, preferred embodiments of the invention as set forth herein are intended to be illustrative, not limiting. Various changes may be made without departing from the invention.

What is claimed is:

1. A valve comprising:
   a valve body having a valve passage that allows fluid communication between a first side and a second side of the valve body;

a valve gate seat associated with the valve body;

a valve gate moveable along a gate passage between a closed position and a retracted position, the gate passage communicating with the valve passage, and at least a portion of the valve gate contacting the gate seat when in the closed position to prevent fluid communication between the first and second sides; and a shutter that impedes communication between the valve passage and the valve gate when the valve gate is in the retracted position, the shutter being positioned away from and out of contact with the valve gate when the valve gate is in the closed position and being actuatable by movement of the valve gate to move between an impeding position and an unimpeding position.

2. The valve of claim 1, further comprising an actuator that moves the valve gate along the gate passage between a closed position and a retracted position.

3. The valve of claim 2, wherein the actuator includes a pneumatic actuator element.

4. The valve of claim 1, further comprising a housing into which the valve gate is retracted when moved to the retracted position; and wherein the shutter covers an opening in the housing when the valve gate is in the retracted position.

5. The valve of claim 4, wherein the shutter includes a door, rotatably mounted to the housing, that covers an opening in the housing.

6. The valve of claim 5, wherein the shutter further comprises a shutter door actuator that moves the door in at least one of an opening direction and a closing direction.

7. The valve of claim 6, wherein the shutter door actuator comprises a coil spring that biases the shutter door toward a closed position.

8. The valve of claim 7, wherein the shutter further comprises at least one roller rotatably mounted to the shutter door, the at least one roller bearing on the valve gate or a shaft connected to the valve gate while the valve gate is extended from the housing to bias the shutter door toward an open position.

9. The valve of claim 8, wherein the shutter further comprises a shutter cover having a cover opening, the shutter cover being fixed to the housing.

10. The valve of claim 1, wherein the valve gate forms a vacuum seal with the valve gate seat when the valve gate is in the closed position.

11. An ion implantation system comprising the valve of claim 1.

12. The ion implantation system of claim 11, further comprising an ion source chamber having an ion source portion and a target portion, the ion source portion communicating with the target portion through the valve passage of the valve body.

13. A vacuum valve for vacuum isolating two portions of an ion source chamber, the vacuum valve comprising:

a valve body having a passage that allows ions to pass from a first chamber portion to a second chamber portion;

a valve seat associated with the valve body;

a valve gate movable between a closed position and a retracted position, at least a portion of the valve gate contacting the valve seat when in the closed position to vacuum isolate the second chamber portion from the first chamber portion; and a shutter that impedes at least substances in the passage from contacting the valve gate when the valve gate is in the retracted position, the shutter being positioned outside of the valve body passage aways from and out of contact with the valve gate when the valve gate is in the closed position and being actuatable by movement of the valve gate to impede substances in the passage from contacting the valve gate.

14. The vacuum valve of claim 13, further comprising a housing within which the valve gate is positioned in the retracted position, the housing having an opening through which the gate travels; and wherein the shutter comprises a shutter door that closes the opening in the housing.

15. A valve comprising:

a valve gate movable from a closed position, which is in an exposed region, to a retracted position, which is in a shielded region; and means for impeding communication between the exposed region and the shielded region after the gate moves to the retracted position to shield the gate from environmental conditions in the exposed region, the means for impeding being actuatable by movement of the valve gate and being positioned away from and out of contact with the valve gate when the valve gate is in the closed position.

16. A valve comprising:

a valve body having a valve passage that allows fluid communication between a first side and a second side of the valve body;

a valve gate seat associated with the valve body;

a valve gate moveable along a gate passage between a closed position and retracted position, the gate passage communicating with the valve passage, and at least a portion of the valve gate contacting the gate seat when in the closed position to prevent fluid communication between the first and second sides; and a housing, including a shutter, that receives the valve gate and impedes communication between the valve passage and the valve gate when the valve gate is in the retracted position, the shutter being actuatable by movement of the valve gate, and the housing and shutter being separable from the valve body.

17. A valve comprising:

a valve body having a valve passage that allows fluid communication between a first side and a second side of the valve body;

a valve gate seat associated with the valve body;

a valve gate moveable along a gate passage between a closed position and a retracted position, the gate passage communicating with the valve passage, and at least a portion of the valve gate contacting the gate seat when in the closed position to prevent fluid communication between the first and second sides;

a housing, including a shutter, that receives the valve gate and impedes communication between the valve passage and the valve gate when the valve gate is in the retracted position; and a shutter cover having a cover opening, the shutter cover fixed to the housing.

* * * * *